United States Patent [19]
Lubowtiz et al.

[11] Patent Number: 5,594,089
[45] Date of Patent: Jan. 14, 1997

[54] HETEROCYCLE OR HETEROCYCLE SULFONE OLIGOMERS WITH MULTIPLE CHEMICALLY FUNCTIONAL END CAPS

[75] Inventors: Hyman R. Lubowtiz, Rolling Hills Estates, Calif.; Clyde H. Sheppard, Post Falls, Id.

[73] Assignee: The Boeing Company

[21] Appl. No.: 327,180

[22] Filed: Oct. 21, 1994

Related U.S. Application Data

[63] Continuation-in-part of Ser. No. 773,381, Sep. 5, 1985, Ser. No. 137,493, Dec. 23, 1987, Ser. No. 167,656, Mar. 14, 1988, Ser. No. 168,289, Mar. 15, 1988, Ser. No. 176,518, Apr. 1, 1988, Ser. No. 212,404, Jun. 27, 1988, Ser. No. 241,997, Sep. 6, 1988, Pat. No. 5,530,089, Ser. No. 460,396, Jan. 3, 1990, Pat. No. 5,446,120, Ser. No. 619,677, Nov. 29, 1990, Ser. No. 639,051, Jan. 9, 1991, Ser. No. 43,824, Apr. 6, 1993, Pat. No. 5,367,083, Ser. No. 79,999, Jun. 21, 1993, Pat. No. 5,403,666, Ser. No. 159,823, Nov. 30, 1993, Pat. No. 5,455,115, Ser. No. 161,164, Dec. 3, 1993, Ser. No. 232,682, Apr. 25, 1994, Pat. No. 5,516,876, Ser. No. 269,297, Jun. 30, 1994, Pat. No. 5,550,204, and Ser. No. 280,866, Jul. 26, 1994, Pat. No. 5,512,676.

[51] Int. Cl.⁶ .................................................. C08G 75/00
[52] U.S. Cl. ...................... 528/171; 524/83; 524/89; 525/420; 525/434; 525/435; 528/170; 528/172; 528/174; 528/183; 528/186; 528/289; 528/290; 528/298; 528/322; 528/329.1; 548/156; 548/220; 548/431; 548/435; 548/476; 548/547

[58] Field of Search ........................... 428/290, 378, 428/394; 524/83, 89; 525/420, 434, 435; 528/170, 171, 174, 172, 175, 183, 186, 289, 290, 298, 322, 329.1; 548/156, 220, 431, 435, 476, 547

[56] References Cited

U.S. PATENT DOCUMENTS

| | | | |
|---|---|---|---|
| 4,868,270 | 9/1989 | Lubowitz et al. | 528/170 |
| 4,965,336 | 10/1990 | Lubowitz et al. | 528/170 |
| 5,066,541 | 11/1991 | Lubowitz et al. | 428/378 |
| 5,082,905 | 1/1992 | Lubowitz et al. | 525/420 |
| 5,120,819 | 6/1992 | Lubowitz et al. | 528/170 |
| 5,126,410 | 6/1992 | Lubowitz et al. | 525/417 |
| 5,198,526 | 3/1993 | Lubowitz et al. | 528/183 |

OTHER PUBLICATIONS

Sheppard et al., "Novel High Temperature matrix Materials," Int. Sampe Exhib. 1986, 31, Mater. Sci. Future 1426–33, Eng.

*Primary Examiner*—Shelley A. Dodson
*Attorney, Agent, or Firm*—John Hammar

[57] ABSTRACT

Thermomechanical and thermo-oxidative stabilities in heterocycle or heterocycle sulfone resin composites are improved by forming four crosslinks at each addition polymerization site in the backbone of the resin using crosslinking functionalities.

20 Claims, No Drawings

HETEROCYCLE OR HETEROCYCLE SULFONE OLIGOMERS WITH MULTIPLE CHEMICALLY FUNCTIONAL END CAPS

REFERENCE TO RELATED APPLICATIONS

The present application is separately a continuation-in-part application based upon each of these seventeen, U.S. patent applications Ser. Nos.:

| APPLI-CATION | TITLE | FILING DATE |
| --- | --- | --- |
| 06/773,381 | Conductive, Thermally Stable Oligomers | September 5, 1985 |
| 07/137,493 | Polyester Oligomers and Blends | December 23, 1987 |
| 07/167,656 | Multidimensional Ether and Ester Oligomers | March 14, 1988 |
| 07/168,289 | Liquid Molding Compounds | March 15, 1988 |
| 07/176,518 | Method for Making Multi-dimensional Polyesters | April 1, 1988 |
| 07/212,404 | Conductive, Multi-dimensional Oligomers and Blends | June 27, 1988 |
| 07/241,997 (now U.S. 5,530,089) | Polysulfoneimides | September 6, 1988 |
| 07/460,396 (now U.S. 5,446,120) | Polyethersulfone Oligomers and Blends | January 3, 1990 |
| 07/619,677 | Advanced Composite Blends | November 29, 1990 |
| 07/639,051 | Reactive Polyarylene Sulfide Oligomers | January 9, 1991 |
| 08/043,824 (now U.S. 5,367,083) | Extended Acid Halide Capping Monomer | April 6, 1993 |
| 08/079,999 (now U.S. 5,403,666) | Composites Containing Amideimide Sized Fibers | June 21, 1993 |
| 08/159,823 (now U.S. 5,455,115) | Polyimide Oligomers and Blends and Method of Curing | November 30, 1993 |
| 08/161,164 | Multidimensional Polyesters | December 3, 1993 |
| 08/232,682 (now U.S. 5,516,876) | Multidimensional Polyamide Oligomers from Polyamine or Polyanhydride Hubs | April 25, 1994 |
| 08/269,297 (now U.S. 5,550,204) | Ester or Ether Oligomers with Multidimensional Morphology | June 30, 1994 |
| 08/280,866 (now U.S. 5,512,676) | Extended Amideimide Hub for Multidimensional Oligomers | July 26, 1994 |

We incorporate these patent applications by reference.

TECHNICAL FIELD

The present invention relates to linear and multidimensional heterocycle or heterocycle sulfone oligomers that include multiple chemically functional crosslinking end cap (terminal) groups, and, preferably, to oligomers that have four crosslinking functionalities at each end of its linear backbones or each multidimensional arm. Composites made from these oligomers generally have improved toughness, thermomechanical stability, and thermo-oxidative stability because of the higher number of crosslinks that form upon curing. Blends are prepared from mixtures of the oligomers and compatible polymers, oligomers, or both.

The present invention also relates to methods for making the oligomers by condensing novel end cap reactive monomers with appropriate reactive monomers for the chains of the respective chemical backbones.

BACKGROUND ART

The thermosetting resins that are commonly used today in fiber-reinforced composites cannot be reshaped after thermoforming. Because errors in forming cannot be corrected, these thermosetting resins are undesirable in many applications. In addition, these thermosetting resins, made from relatively low molecular weight monomers, are relatively low molecular weight, and often form brittle composites that have relatively low thermal stabilities.

Although thermoplastic resins are well known, practical aerospace application of high performance, fiber-reinforced thermoplastic resins is relatively new. Fiber in such composites toughens and stiffens the thermoplastic resin. While the industry is exploring lower temperature thermoplastic systems, like fiber-reinforced polyolefins or PEEKs, our focus is on high performance thermoplastics suitable, for example, for primary structure in advanced high speed aircraft including the High Speed Civil Transport (HSCT). These materials should have high tensile strength, and high glass transitions. Such materials are classified as "engineering thermoplastics." At moderate or high temperatures, the low performance, fiber-reinforced thermoplastic composites (polyolefins or PEEKS, for example) lose their ability to carry loads because the resin softens. Thus, improved thermal stability is needed for advanced composites to find applications in many aerospace situations. The oligomers of the present invention produce advanced composites.

Advanced composites should be thermoplastic, solvent resistant, tough, impact resistant, easy to process, and strong. Oligomers and composites that have high thermomechanical stability and thermo-oxidative stability are particularly desirable.

While epoxy-based composites like those described in U.S. Pat. No. 5,254,605 are suitable for many applications, their brittle nature and susceptibility to degradation often force significant design concessions when these epoxies are selected for aerospace applications. The epoxies are inadequate for applications which require thermally stable, tough composites, especially when the composites are expected to survive for a long time in a hot, oxidizing environment. Recent research has focused on polyimide composites to achieve an acceptable balance between thermal stability, solvent resistance, and toughness for these high performance applications. Still the maximum temperatures for use of the polyimide composites, such as those formed from PMR-15, can only be used at temperatures below about 600°–625° F. (315°–330° C.), since they have glass transition temperatures of about 690° F. (365° C.). PMR composites are usable in long term service (50,000 hours) at about 350° F. (170° C.). They can withstand temperatures up to about 600° F. (315° C.) for up to about five hundred hours.

PMR-15 prepregs, however, suffer significant processing limitations that hinder their adoption because the prepreg has a mixture of the unreacted monomer reactants on the fiber-reinforcing fabric, making them sensitive to changes in temperature, moisture, and other storage conditions, which cause the prepregs to be at different stages of cure. The resulting composites have varying, often unpredictable properties. Aging these PMR prepregs even in controlled environments can lead to problems. The reactants on the prepreg are slowed in their reaction by keeping them cold, but the quality of the prepreg depends on its absolute age and on its prior storage and handling history. And, the quality of the composite is directly proportional to the quality of the prepregs. In addition, the PMR monomers are toxic or hazardous (especially MDA), presenting health and safety concerns for the workforce. Achieving complete formation of stable imide rings in the PMR composites remains an issue. These and other problems plague PMR-15 composites.

The commercial long chain polyimides also present significant processing problems. AVIMID-N and AVIMID-KIII (trademarks of E. I. duPont de Nemours) resins and prepregs differ from PMRs because they do not include aliphatic chain terminators which the PMRs use to control molecular weight and to retain solubility of the PMR intermediates during consolidation and cure. Lacking the chain terminators, the AVIMIDs can chain extend to appreciable molecular weights. To achieve these molecular weights, however, the AVIMIDs (and their LARC cousins) rely on the melting of crystalline powders to retain solubility or, at least, to permit processing. It has proven difficult to use the AVIMIDs in aerospace parts both because of their crystalline melt intermediate stage and the PMR plague that these AVIMID prepregs also suffer aging.

So, research continues and is now turning toward soluble systems like those we described in our earlier patents, including acetylenic-terminated AVIMID-KIII prepregs of the Hergenrother (NASA-Langley) type.

For these soluble systems, many different polyimide sulfone compounds have been synthesized to provide unique properties or combinations of properties. For example, Kwiatkowski and Brode (U.S. Pat. No. 3,839,287) synthesized monofunctional, maleic-capped linear polyarylimides. Holub and Evans (U.S. Pat. No. 3,729,446) synthesized similar maleic or nadic-capped, imido-substituted polyester compositions.

For imides and many other resin backbones we have shown surprisingly high glass transition temperatures, reasonable processing parameters and constraints for the prepregs, and desirable physical properties for the composites by using soluble oligomers having difunctional caps, especially those with nadic caps. Linear oligomers of this type include two crosslinking functionalities at each end of the resin chain to promote crosslinking upon curing. Linear oligomers are "monofunctional" when they have one crosslinking functionality at each end. The preferred oligomers from our earlier research were "difunctional," because they had two functional groups at each end. Upon curing, the crosslinking functionalities serve as sites for chain extension. Because the crosslinks are generally the weakest portions of the resulting composite, we improved thermooxidative stability of the composites by including two crosslinks at each junction. We built in redundancy, then, at each weak point. We maintained solubility of the reactants and resins using, primarily, phenoxyphenyl sulfone chemistries. Our work during the past fifteen years across a broad range of resin types or chemical families is described in the following, forty-nine United States Patents (all of which we incorporate by reference):

| INVENTOR | PATENT | TITLE | ISSUE DATE |
| --- | --- | --- | --- |
| Lubowitz et al. | 4,414,269 | Solvent Resistant Polysulfone and Polyethersulfone Composites | November 8, 1983 |
| Lubowitz et al. | 4,476,184 | Thermally Stable Polysulfone Compositions for Composite Structures | October 9, 1984 |
| Lubowitz et al. | 4,536,559 | Thermally Stable Polyimide Polysulfone Compositions for Composite Structures | August 20, 1985 |
| Lubowitz et al. | 4,547,553 | Polybutadiene Modified Polyester Compositions | October 15, 1985 |
| Lubowitz et al. | 4,584,364 | Phenolic-Capped Imide Sulfone Resins | April 22, 1986 |
| Lubowitz et al. | 4,661,604 | Monofunctional Crosslinking Imidophenols | April 28, 1987 |
| Lubowitz et al. | 4,684,714 | Method for Making Polyimide Oligomers | August 4, 1987 |
| Lubowitz et al. | 4,739,030 | Difunctional End-Cap Monomers | April 19, 1988 |
| Lubowitz et al. | 4,847,333 | Blended Polyamide Oligomers | July 11, 1989 |
| Lubowitz et al. | 4,851,495 | Polyetherimide Oligomers | July 25, 1989 |
| Lubowitz et al. | 4,851,501 | Polyethersulfone Prepregs, Composites, and Blends | July 25, 1989 |
| Lubowitz et al. | 4,868,270 | Heterocycle Sulfone Oligomers and Blends | September 19, 1989 |
| Lubowitz et al. | 4,871,475 | Method for Making Polysulfone and Polyethersulfone Oligomers | October 3, 1989 |
| Lubowitz et al. | 4,876,328 | Polyamide Oligomers | October 24, 1989 |
| Lubowitz et al. | 4,935,523 | Crosslinking Imidophenylamines | June 19, 1990 |
| Lubowitz et al. | 4,958,031 | Crosslinking Nitromonomers | September 18, 1990 |
| Lubowitz et al. | 4,965,336 | High Performance Heterocycle Oligomers and Blends | October 23, 1990 |
| Lubowitz et al. | 4,980,481 | Pyrimidine-Based End-Cap Monomers and Oligomers | December 25, 1990 |
| Lubowitz et al. | 4,981,922 | Blended Etherimide | January 1, 1991 |

-continued

| INVENTOR | PATENT | TITLE | ISSUE DATE |
|---|---|---|---|
| Lubowitz et al. | 4,985,568 | Method of Making Crosslinking Imidophenyl-amines Oligomers | January 15, 1991 |
| Lubowitz et al. | 4,990,624 | Intermediate Anhydrides Useful for Synthesizing Etherimides | February 5, 1991 |
| Lubowitz et al. | 5,011,905 | Polyimide Oligomers and Blends | April 30, 1991 |
| Lubowitz et al. | 5,066,541 | Multidimensional Heterocycle Sulfone Oligomers | November 19, 1991 |
| Lubowitz et al. | 5,071,941 | Multidimensional Ether Sulfone Oligomers | December 10, 1991 |
| Lubowitz et al. | 5,175,233 | Multidimensional Ester or Ether Oligomers with Pyrimidinyl End Caps | December 29, 1992 |
| Lubowitz et al. | 5,082,905 | Blended Heterocycles | January 21, 1992 |
| Lubowitz et al. | 5,087,701 | Phthalimide Acid Halides | February 11, 1992 |
| Lubowitz et al. | 5,104,967 | Amideimide Oligomers and Blends | April 14, 1992 |
| Lubowitz et al. | 5,109,105 | Polyamides | April 28, 1992 |
| Lubowitz et al. | 5,112,939 | Oligomers Having Pyrimidinyl End Caps | May 12, 1992 |
| Lubowitz et al. | 5,115,087 | Coreactive Imido Oligomer Blends | May 19, 1992 |
| Lubowitz et al. | 5,116,935 | High Performance Modified Cyanate Oligomers and Blends | May 26, 1992 |
| Lubowitz et al. | 5,120,819 | High Performance Heterocycles | June 9, 1992 |
| Lubowitz et al. | 5,126,410 | Advanced Heterocycle Oligomers | June 30, 1992 |
| Lubowitz et al. | 5,144,000 | Method for Forming Crosslinking Oligomers | September 1, 1992 |
| Lubowitz et al. | 5,151,487 | Method of Preparing a Crosslinking Oligomer | September 29, 1992 |
| Lubowitz et al. | 5,155,206 | Amideimide Oligomers, Blends and Sizings for Carbon Fiber Composites | October 13, 1992 |
| Lubowitz et al. | 5,159,055 | Coreactive Oligomer Blends | October 27, 1992 |
| Lubowitz et al. | 5,175,234 | Lightly-Crosslinked Polyimides | December 29, 1992 |
| Lubowitz et al. | 5,175,304 | Halo- or Nitro- Intermediates Useful for Synthesizing Etherimides | December 29, 1992 |
| Lubowitz et al. | 5,198,526 | Heterocycle Oligomers with Multidimensional Morphology | March 30, 1993 |
| Lubowitz et al. | 5,210,213 | Multidimensional Crosslinkable Oligomers | May 11, 1993 |
| Lubowitz et al. | 5,216,117 | Amideimide Blends | June 1, 1993 |
| Lubowitz et al. | 5,227,461 | Extended Difunctional End-Cap Monomers | July 13, 1993 |
| Lubowitz et al. | 5,239,046 | Amideimide Sizing For Carbon Fiber | August 24, 1993 |
| Lubowitz et al. | 5,268,519 | Lightly Crosslinked Etherimide Oligomers | December 7, 1993 |
| Lubowitz et al. | 5,286,811 | Blended Polyimide Oligomers and Method of Curing Polyamides | February 15, 1994 |
| Lubowitz et al. | 5,344,894 | Polyimide Oligomers and Blends | September 6, 1994 |
| Lubowitz et al. | 5,446,120 | Polyethersulfone Oligomers of Blends | August 29, 1995 |
| Lubowitz et al. | 5,367,083 | Extended Acid Halide Capping Monomer | November 22, 1994 |
| Lubowitz et al. | 5,403,666 | Composites Containing Amideimide Sized Fibers | April 4, 1995 |
| Lubowitz et al. | 5,455,115 | Post-Cure Method for Polyimide Oligomers | October 3, 1995 |

The heterocycles (i.e., oxazoles, thiazoles, or imidazoles) use a processing principle more akin to the AVIMIDs than the phenoxyphenyl sulfone solubility principle of our other resins. The heterocycles have poor solubility, even with our "sulfone" chemistries, but they at least form liquid crystals or soluble crystals in strong acids. To produce non-crystalline (amorphous) composites we capitalize on the ability of our heterocycles to melt at the same temperature range as the cure and promote crosslinking in the melt. With relatively low molecular weight, capped, heterocycle oligomers, we can autoclave process these materials. Autoclave processing is a significant achievement for these heterocycles which present to the industry, perhaps, the most challenging problems. The polybenzoxazoles we produced, in addition, are useful at temperatures up to about 750°–775° F. (400°–413° C.), since they have glass transition temperatures of about 840° F. (450° C.).

Some aerospace applications need composites which have even higher use temperatures than these polybenzoxazoles while maintaining toughness, solvent resistance, ease of processing, formability, strength, and impact resistance. Southcott et al. discuss the problems of the prior art imide systems and the advantages of our soluble monofunctional and dinadic-capped imide systems in the article: Southcott et al., *"The development of processible, fully imidized, polyimides for high-temperature applications,"* 6 High Perform. Polym., 1–12 (U.K. 1994). For these extremely demanding requirements, our multidimensional oligomers (i.e., oligomers that have three or more arms extending from a central organic hub to yield three-dimensional morphology) have superior processing parameters over more conventional, linear oligomers that might produce composites having these high thermal stabilities. Our multidimensional oligomers can satisfy the thermal stability requirements and can be processed at significantly lower temperatures. Upon curing the end caps of the multidimensional oligomers crosslink so that the thermal resistance of the resulting composite is markedly increased with only a minor loss of stiffness, matrix stress transfer (impact resistance), toughness, elasticity, and other mechanical properties. We can achieve glass transition temperatures above 950° F. (510° C.) with composites cured from our difunctional multidimensional oligomers (which we call "star-burst" oligomers). Of course, a full range of use temperatures are possible by selecting the hubs (which usually is an aromatic moiety), the backbone monomers used in the arms, end caps, and number of crosslinking functionalities per cap.

We now believe we can achieve even better properties in heterocycle and heterocycle sulfone composites by including an even higher number of crosslinking functionalities than the mono- or difunctional systems of the linear or multidimensional resins discussed in our earlier patents or patent applications. The higher density of crosslinks provide redundancy at those locations in the macromolecular, cured composite which are most susceptible to thermal degradation.

SUMMARY OF THE INVENTION

The present invention provides heterocycle and heterocycle sulfone oligomers that produce advanced composites with high thermomechanical stability and high thermooxidative stability by using four crosslinking functionalities (i.e., unsaturated hydrocarbon moieties) at each end of the oligomer. Upon curing, the crosslinking functionalities on adjacent oligomers form four parallel linkages in the composite to provide the improved stabilities. The composites we form from our multiple chemically functional oligomers have even higher thermal stabilities for comparable backbone and molecular weight and have higher compressive strengths than our composites formed using our mono- or difunctional oligomers. The preferred oligomers generally have stable, fully aromatic backbones. Sulfone (—$SO_2$—) or other electronegative linkages ("L") selected from the group consisting of —$SO_2$—, —S—, —CO—, —$(CF_3)_2C$—, or —$(CH_3)_2C$— in the backbones between aromatic groups provide improved toughness for the composites. A typical backbone usually has repeating units of the general formula:

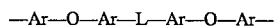

wherein Ar is an aromatic radical (and preferably phenylene) and L is an electronegative linkage as previously defined. In this description we will refer to "L" as a sulfone. Any of the identified electronegative groups can be substituted, however, for —$SO_2$—.

The four caps at each end of the backbone of a linear oligomer or at the end of each arm of a multidimensional oligomer provide areas of high stiffness in the composite product. These stiff, highly crosslinked areas are relatively lightly interspersed, yielding superior composites for aerospace applications. Generally, highly crosslinked matrices yield high compressive strength but the composites are brittle.

Our preferred four functional oligomers are formed by reacting in the appropriate stoichiometry an end cap monomer with one or more reactants selected to form the predominant and characteristic backbone linkages by which we identify the nature of the resulting oligomer.

Multidimensional oligomers include an organic hub and three or more substantially identical radiating arms, each arm terminating with a residue of a multifunctional crosslinking end cap monomer. Suitable hubs radicals are described in the patents we earlier incorporated by reference with respect to our monofunctional and difunctional oligomer research, although we prefer a 1,3,5-phenylene (i.e., benzenetriyl). For multiple chemically functional end caps, we prefer linear morphology over multidimensional morphology because linear systems are easier to prepare to have significant MW in the backbone between the caps. Such high MW better allows the micelles that form on crosslinking to provide their advantages to the compressive strength.

We can also blend our linear or multidimensional oligomers as we did with the difunctional systems. A blend might include a linear oligomer with a comparable linear polymer, a multidimensional oligomer with a multidimensional polymer, a linear oligomer with a multidimensional oligomer, or the like. By "polymer," we mean a resin that does not include the crosslinking functionalities of our oligomers. By "oligomer," we mean any molecular weight moiety that includes crosslinking functionalities at its ends to allow it to react (chain-extend) to increase the effective molecular weight when the oligomer cures to form a composite. By "crosslinking functionality," we mean a terminating, unsaturated hydrocarbon group that can be thermally or chemically activated when the resin is in the melt to covalently bond to an adjacent, corresponding moiety on another oligomer.

A blend will generally include substantially equimolar amounts of the oligomer and a polymer. The polymer will generally have the same backbone structure and MW as the oligomer (or it might have a higher MW since the oligomer will chain-extend upon curing).

Prepregs and composites are the most preferred products of the oligomers and blends. By "composite," we mean the product of curing and consolidating the oligomers to produce high MW chains through crosslinking, chain extension.

BEST MODE CONTEMPLATED FOR CARRYING OUT THE INVENTION

1. Heterocycle or Heterocycle Sulfone Oligomers

Our heterocycles are related to imides (i.e., they contain five member rings alternating with six member rings in a repeating order) and yield composite products of high thermo-oxidative stability. We will discuss the linear heterocycles before discussing multidimensional ones. The oligomers of the present invention have four crosslinking functionalities on the ends of each chain and generally are analogs of the monofunctional and difunctional heterocycle and heterocycle sulfone oligomers described in our U.S. Pat. Nos. 4,868,270; 5,082,905; 5,120,819; 5,126,410; and 5,198,526.

a. Linear heterocycles

To prepare linear heterocycle or heterocycle sulfone oligomers, (i.e., oligomers that include oxazoles, thiazoles, or imidazoles), we usually condense:

(a) 2 moles of an acid halide or extended acid halide endcap monomer;

(b) n moles of a diacid halide, particularly an aromatic diacid halide having a plurality of aryl groups linked by ether or "sulfone" linkages (L) or mixtures of both (especially XOC—Ø—O—Ø—SO$_2$—Ø—O—Ø—COX); and (c) (n+1) moles of a four functional basic compound of the formula:

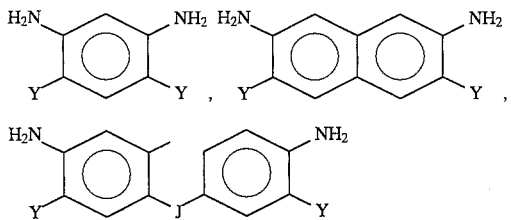

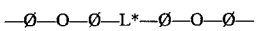

J=—CO—, —SO$_2$—, —(CF$_3$)$_2$C—, —S—, or —O—; and

Y=—OH, —SH, or —NH$_2$.

In what we call "heterocycles," the four functional basic compound generally is selected front the group consisting of dihydoxybenzidine, dimercaptobenzidine, dihydroxydiaminobenzene, dimercaptodiaminobenzene, or diaminobenzidine. When the four functional compound has the —Ø—J—Ø— linkage, we call the oligomers "heterocycle sulfones," because of the intermediate sulfone ("J") within the basic compound. We can use isomers of the four functional basic compound so long as the isomers include two pairs of linkages, each pair including an amine and a "Y" functionality on adjacent carbons of an aromatic radical.

Preferred heterocycle or heterocycle sulfone oligomers have MWs between about 500 and about 30,000; more preferably, between about 1,000 to 20,000; and most preferably, between about 1,000 to 5,000. Again, we try to synthesize as high MW oligomers as we can so long as the oligomers remain processible (i.e., for heterocycles, soluble crystals that cure in the melt phase). The heterocycle condensation reaction is generally carried out at ambient conditions or below under an inert atmosphere (dry N$_2$ purge) in a suitable solvent including an excess of base to eliminate the possibility of undesirable side reactions that might otherwise occur in an acidic solution. Pyridine is preferred over other bases, such as NaOH or KOH.

Diacid halide reactants

The diacid halide (or dicarboxylic acid [i.e., dibasic acid]; general formula: XOC—R$_9$—COX) may include an aromatic chain segment (i.e., R$_9$) selected from the group consisting of:

(a) phenylene;

(b) naphthylene;

(c) biphenylene;

(d) a polyaryl "sulfone" divalent radical of the general formula:

—Ø—O—Ø—L*—Ø—O—Ø— wherein L*=—S—, —O—, —CO—, —SO$_2$—, —(Me)$_2$C—, or —(CF$_3$)$_2$C—, (e) a divalent radical having conductive linkages, illustrated by Schiff base compounds, selected from the group consisting of:

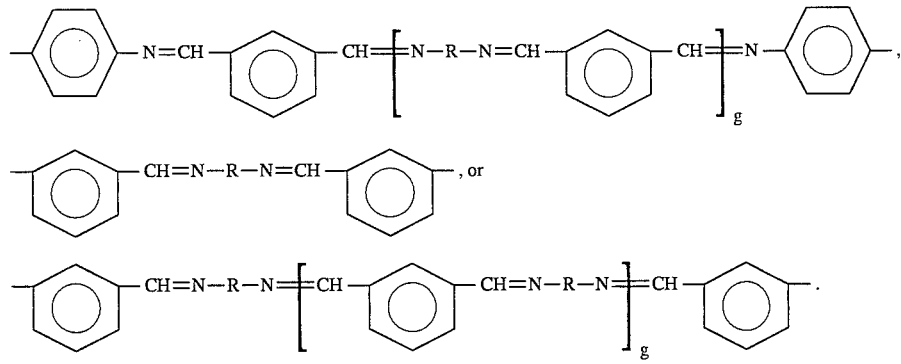

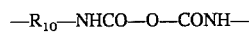

wherein R is selected from the group consisting of: phenylene; biphenylene; naphthylene; or a divalent radical of the general formula: —Ø—W—O— wherein W=—SO$_2$— or or —CH$_2$—; and g=0–4; or (f) a divalent radical of the general formula:

—R$_{10}$—NHCO—O—CONH— wherein

R$_{10}$=a C$_2$ to C$_{12}$ divalent aliphatic, alicyclic, or aromatic radical, and, preferably, phenylene (as described in U.S. Pat. No. 4,556,697).

The preferred diacid halide is a dibasic carboxylic acid halide of a divalent organic radical selected front the group consisting of:

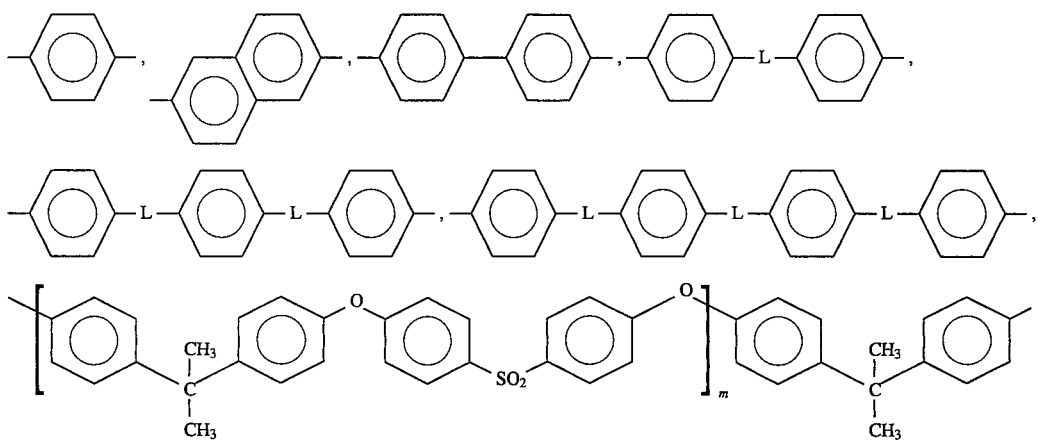

wherein m is an integer, generally from 1–5, and the other variables are as previously defined.

The most preferred acid halides have intermediate ether and/or sulfone linkages to increase solubility and include:

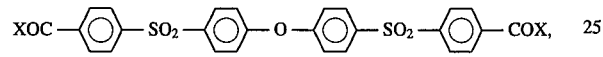

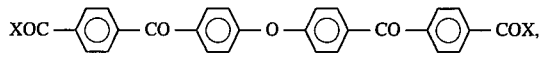

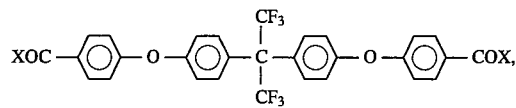

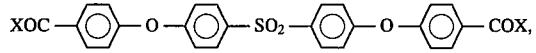

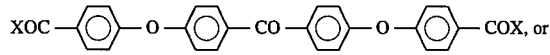

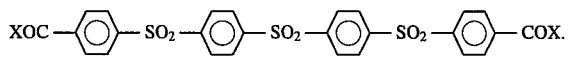

We can prepare Schiff base diacid halides by the condensation of aldehydes and aminobenzoic acid halide (or other amine/adds) in the general reaction scheme:

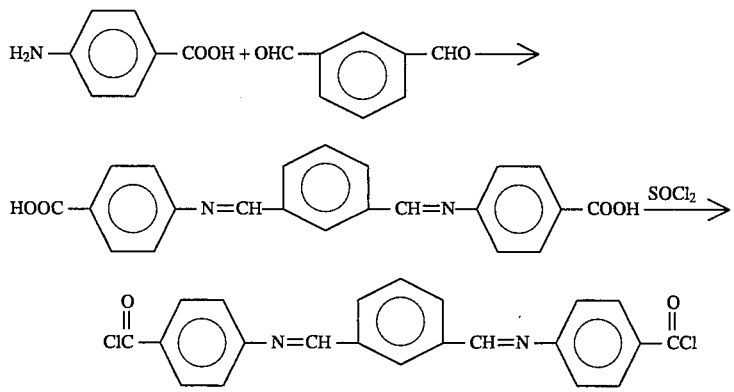

or similar syntheses.

U.S. Pat. No. 4,504,632, discloses other diacid halides that we can use including:
adipylchloride,
malonyl chloride,
succinyl chloride,
glutaryl chloride,
pimelic acid dichloride,
suberic acid dichloride,
azelaic acid dichloride,
sebacic acid dichloride,
dodecandioic acid dichloride,
phthaloyl chloride,
isophthaloyl chloride,
terephthaloyl chloride,
1,4-naphthalene dicarboxylic acid dichloride, and
4,4'-diphenylether dicarboxylic acid dichloride.

We prefer polyaryl or aryl diacid halides to achieve the highest thermal stabilities in the resulting oligomers and composites. Particularly preferred compounds include intermediate "sulfone" (i.e. electronegative) linkages (i.e., "L") to improve the toughness of the resulting oligomers.

Suitable diacid halides include compounds made by reacting nitrobenzoic acid with a bisphenol (which might also be called a dihydric phenol, dialcohols, or diol). The reaction is the counterpart of that for making diamines. The bisphenol is preferably selected from the group previously described for the imide syntheses. We prefer bisphenols having aromatic character (i.e., absence of aliphatic segments), such as bisphenol-A. While we prefer bisphenol-A (because of cost and availability), we can use the other bisphenols to add rigidity to the oligomer without significantly increasing the average formula weight over bisphenol-A residues, and, therefore, can increase the solvent resistance. Random or block copolymers from using different bisphenols are possible (here as well as with the other backbones).

The bisphenol may be in phenate form, or a corresponding sulfhydryl can be used. Of course, can use we mixtures of bisphenols and bisulfhydryls.

Bisphenols of the type described are commercially available. Some may be easily synthesized by reacting a dihalogen intermediate with bis-phenates, such as the reaction of 4,4'-dichlorophenylsulfone with bis(disodium biphenolate), as we discussed in our earlier patents.

We can also prepare the heterocycle or heterocycle sulfone oligomers of the present invention by the condensation of:

(a) 2 moles of an extended phenol end cap monomer;

(b) n moles of four functional basic compound; and (c) (n+1) moles of a suitable diacid halide.

Blends analogous to the imide blends can improve impact resistance of the heterocycle or heterocycle sulfone composites without causing a significant loss of solvent resistance.

In synthesizing comparable polymers for these heterocycle blends, we can use quenching end caps (benzoic acid or phenol), if desired, to regulate the polymerization of the comparable polymer, so that it has a MW substantially identical with or higher than, the crosslinkable oligomer.

The blends will generally comprise a mixture of the oligomer and the same heterocycle polymer (i.e., oxazole oligomer and oxazole polymer). The polymer may, however, be a different heterocycle from the oligomer, such as an imide, imidazole, or thiazole when the oligomer is an oxazole. The mixture may even include several types of oligomers or several types of polymers, such as a three component mixture of an oxazole oligomer, a thiazole oligomer, and an imidazole polymer. In advanced composite blends, the polymer may be from an entirely different chemical family.

Four functional basic compounds

The base on the condensation is selected from:

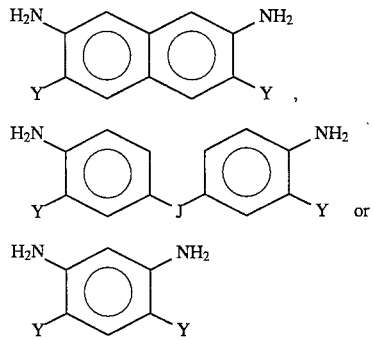

wherein J and Y are previously defined.

The four functional basic compounds and diacid halides are commercially available from Hoescht or Burdick & Jackson, or are readily prepared from these commercial compounds.

b. Multidimensional heterocycles

We can synthesize multidimensional heterocycle oligomers using an aromatic hub, such as cyuranic acid (or its acid halide), the four functional compounds characteristic of our heterocycles, and an acid halide or an extended acid halide end cap monomer. We make other multidimensional heterocycles using a polyol hub, diacid halides, the four functional compounds, and a phenol or acid halide end cap monomer.

Multidimensional acid hubs

We can convert the triazine derivatives described in U.S. Pat. No. 4,574,154 to acid halides by reacting the amine functionalities with phthalic acid anhydride to form imide linkages and terminal acid functionalities (that we convert to acid halides). We can also use the triazine derivatives of U.S. Pat. No. 4,617,390 (or the acid halides) as the hub for multidimensional heterocycles.

By reacting polyol aromatic hubs, such as phloroglucinol, with nitrobenzoic acid or nitrophthalic acid to form ether linkages and terminal carboxylic acid functionalities, we produce acid hubs. The nitrobenzoic acid products would have three active sites while the nitrophthalic acid products would have six; each having the respective formula:

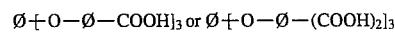

Of course we can use other nitro/acids.

We can react extended triamine hubs of the formula:

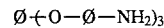

with an acid anhydride (i.e., trimellitic acid anhydride) to form a polycarboxylic acid hub of the formula:

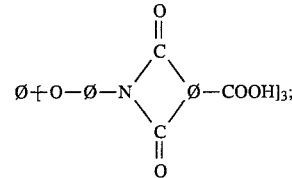

the hub being characterized by an intermediate ether and imide linkage connecting aromatic groups. We can also use thio-analogs in accordance with U.S. Pat. No. 3,933,862.

Multidimensional polyol hubs

The hub may also be a polyol such as phloroglucinol or those tris(hydroxyphenyl)alkanes described in U.S. Pat. No. 4,709,008 of the general formula:

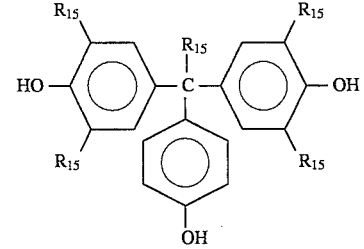

wherein $R_{15}$ is hydrogen or methyl and can be the same or different. These polyols are made by reacting, for example, 4-hydroxybenzaldehyde or 4-hydroxyacetophenone with an excess of phenol under acid conditions (as disclosed in U.S. Pat. Nos. 4,709,008; 3,579,542; and 4,394,469). We generally react the polyols with nitrophthalic anhydride, nitroaniline, nitrobenzoic acid, or a diacid halide to form the actual reactants (i.e., amines or acid halides) that are suitable as heterocycle hubs, as will be understood by those of ordinary skill.

Phenoxyphenylsulfone arms radiating from any of these hubs with either a terminal amine or carboxylic acid are also precursors for making multidimensional heterocycle oligomers of the present invention.

The best results for multidimensional heterocycles are likely to occur when the hub is cyuranic acid, and when a four functional compound and end cap monomer react with the hub to form a short armed oligomer having twelve crosslinking sites. These compounds are the simplest multidimensional oligomers and are relatively inexpensive to synthesize.

We can also prepare blends of the multidimensional oligomers, comparable to the blends of linear oligomers.

Here, as for all our multiple chemically functional oligomers, we can synthesize the heterocycle oligomers in a homogeneous reaction scheme wherein all the reactants are mixed at one time, or in a stepwise reaction scheme wherein the radiating chains are affixed to the hub and the product of the first reaction is subsequently reacted with the end cap groups. Of course, we can react the hub with end-capped arms that include one reactive, terminal functionality for linking the arm to the hub. Homogeneous reaction is preferred, resulting undoubtedly in a mixture of oligomers because of the complexity of the reactions. The products of the processes (even without distillation or isolation of individual species) are preferred oligomer mixtures which we can use without further separation of the synthetic product species to form the desired advanced composites.

c. Semiconductive oligomers

The composites may be conductive or semiconductive when suitably doped. The dopants are preferably selected from compounds commonly used to dope other polymers, namely, (1) dispersions of alkali metals (for high activity) or (2) strong chemical oxidizers, particularly alkali perchlorates (for lower activity). We do not recommend arsenic compounds and elemental halogens, while active dopants, are too dangerous for general usage.

The dopants apparently react with the oligomers or polymers to form charge transfer complexes. N-type semiconductors result from doping with alkali metal dispersions. P-type semiconductors result from doping with elemental iodine or perchlorates. We recommend adding the dopant to the oligomer or blend prior to forming the prepreg.

While research into conductive or semiconductive polymers has been active, the resulting compounds (mainly polyacetylenes, polyphenylenes, and polyvinylacetylenes) are unsatisfactory for aerospace applications because the polymers are unstable in air; unstable at high temperatures; brittle after doping; toxic because of the dopants; or intractable. These problems are overcome or significantly reduced with the conductive oligomers of the present invention.

Incorporation of electronegative ("sulfone") linkages (L) in the four functional basic compound improves the toughness of the resulting composites without significant decrease of the other physical properties. While the heterocycles improve over conventional heterocycles by the use of electronegative linkages in the diacid halides, those having the additional "sulfone" linkages provide even better physical properties beneficial for structural aerospace applications. On either side of the rigid heterocycle linkages in the backbone, the electronegative ("sulfone") linkages provide stress relief.

Several examples of possible heterocycle syntheses follow.

EXAMPLE 1

Synthesis of bis(3-methylphenoxyphenyl) sulfone.

Charge a reaction flask fitted with a stirrer, thermometer, Barrett trap condenser, and nitrogen inlet tube with 88.3 grams (0.82 moles) of m-cresol, 286.6 grams of dimethyl sulfoxide (DMSO), 134.8 grams of toluene, and 65.3 grams of a 50% NaOH solution. We heated the mixture to 127° C. and remove the water. Then heat the mixture to 165° C. to remove the toluene, and cool it to 110° C. before adding 111.7 grams (0.39 moles) of dichlorodiphenylsulfone. Reheat the mixture for 4 hours at 141° C., before pouring the mixture into 3 liters of water to crystallize an intermediate. Decant the water, and add 1 liter of 2-propanol. Heat this mixture until the majority of the product dissolves. Recrystallize the product, recover by filtration, wash with 3 liters of water followed by 500 ml of 2-propanol, and dry. 167.4 grams of a bis(2-methylphenoxyphenyl)sulfone product resulted. The melting point ranged from 83°–85° C.

EXAMPLE 2

Synthesis of bis(3-carboxyphenoxyphenyl) sulfone.

We charged a reaction flask fitted with a stirrer, condenser, thermometer, and $N_2$ purge with 100 grams of the product of Example 10, 775 grams of pyridine, and 155 grams of water. The mixture was refluxed, oxidized with 49 grams of $KMnO_4$, and filtered to recover the intermediate to which 775 grams of 1.8N NaOH solution was added. We refluxed, oxidized, and filtered the mixture again. The oxidation steps were repeated 5 times. The resulting final product had a melting point ranging from about 213.5° to 219° C.

EXAMPLE 3

Synthesis of the acid chloride of the product obtained in Example 2.

Twenty grams of the product of Example 2 was mixed with 61.2 grams of $SOCl_2$ in a reaction flask, fitted with a stirrer, condenser, thermometer, and dry-$N_2$ purge. The mixture was refluxed for 2 hours and the $SOCl_2$ was distilled off. We added 200 milliliters of benzene and refluxed, cooled, and filtered the mixture to recover the raw product which was recrystallized to a powder. The powder was mixed with 200 milliliters of benzene, refluxed, and cooled to form a precipitate that had a melting range of about 115° to 118° C.

EXAMPLE 4

Proposed synthesis of nadic-capped four functional benzoxazole.

In a flask equipped with a nitrogen purge and a mechanical stirrer, mix 3,3'-dihydroxybenzidine with pyridine and N,N'-dimethylacetamide. Stir the mixture in an ice water bath until the mixture temperature reaches 10° C. Then, dissolve bis(4-carboxyphenoxy-phenylsulfone acid chloride and an acid chloride end cap monomer having nadic caps in N,N'odimethylacetamide, and add this mixture to the reaction flask. Stirring continues for 4 hours following completion of the addition of the reactants. Recover a product by pouring the reaction mixture into water and blending the resulting mixture. Remove residual hydrochloride salts from the recovered product (after filtering) by washing the product thoroughly with water before drying the product at 100° C.

EXAMPLE 5

Proposed synthesis of nadic capped benzoxazole.

The acid chloride terminated sulfone of Example 3 can be mixed with the nadic capped acid chloride of Example 4 in methylenedichloride and a suitable base (pyridine). Add the resulting mixture with an addition funnel to a stirred slurry containing a four functional compound of the formula:

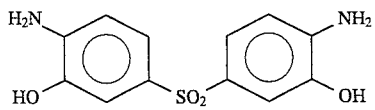

Remove the product.

The weight average molecular weight (MW) of the multiple chemically functional oligomers of the present invention should provide thermoplastic character to the oligomer and generally should be between 5,000 and 40,000, but is preferably between about 10,000 and 35,000, and still more preferably is between 15,000 and 30,000. Such weights are usually achievable by using between 1–20 of each reactant in the backbone (with two caps, of course, for linear systems) and often between 1–5 of each reactant, as those of ordinary skill will recognize. We seek to synthesize the highest MW that we can which will remain soluble and easy to process. Heterocycles are a special case. We seek the highest MW that we can successfully synthesize repeatedly and reliably. Within the preferred range, the oligomers are relatively easy to process to form composites that are tough, have impact resistance, possess superior thermomechanical properties, and have superior thermo-oxidative stability. When oligomers having MW less than about 5,000 are cured by crosslinking, the thermosetting character of the material is increased so that the ability to thermoform the product may be drastically reduced or eliminated.

For the heterocycles, we believe the mechanism is to cure in the crystalline melt, which poses even greater questions for processing for the four functional oligomers than our difunctional heterocycles analogs.

"Heterocycle" includes oxazole, thiazole, and imidazole. We use "linear" to mean generally in a line or in one plane and to distinguish readily from "multidimensional" where we produce 3-D systems. "Linear" systems are not perfectly straight, because of carbon chemistry. "Linear" systems are the conventional morphology for polymer chemistry resulting from "head-to-tail" condensation of the reactants to form a chain. "Multidimensional" oligomers include a hub from which three or more arms extend.

We seek thermally stable oligomers suitable for high temperature advanced composites and such oligomers generally include a high degree of aromatic groups. The stable aromatic bond energies produce an oligomer with outstanding thermal stability. Acceptable toughness and impact resistance is gained through selection of the linkages within the linear chains or in the arms of aromatic groups radiating in our multidimensional oligomers from the central aromatic hub. These toughening linkages are ethers, esters, and the electronegative ("sulfone") linkages (L) selected from the group consisting of —CO—, —SO$_2$—, —S—, —(CF$_3$)$_2$C—, or —(Me$_3$)$_2$C—, that we earlier discussed. Generally, —CO— and —SO$_2$— groups are preferred for cost, convenience, and performance. The group —S—S— should be avoided, since it is too thermally labile.

In multidimensional oligomers, the organic hub ($\partial$) includes a plurality of rays or spokes radiating from the hub in the nature of a star to provide multidimensional crosslinking through suitable terminal groups with a greater number (i.e. higher density) of crosslinking bonds than linear arrays provide. Usually the hub will have three radiating chains to form a "Y" pattern. In some cases, we use four chains. Including more chains may lead to steric hindrance as the hub is too small to accommodate the radiating chains. We prefer a trisubstituted phenyl hub with the chains being symmetrically placed about the hub.

Although the preferred aromatic moieties are aryl groups (such as phenylene, biphenylene, and naphthylene), other aromatic groups can be used, if desired, since the stabilized aromatic bonds will also probably provide the desired thermal stability. For example, we can use

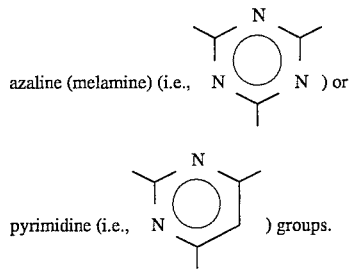

We cure the prepregs by conventional vacuum bag autoclave techniques to crosslink the end caps. The resulting product is a cured, thermally stable, solvent-resistant composite. Post-curing to ensure essentially complete addition polymerization through the four-caps likely is desirable if not essential.

Blended oligomers typically comprise a substantially equimolar amount of the oligomer and a comparable polymer that is incapable of crosslinking with the selected crosslinkable oligomers. These blends merge the desired properties of crosslinking oligomers with those of the non-crosslinking polymer to provide tough, yet processible, resin blends. The comparable polymer is usually synthesized by condensing the same monomer reactants of the crosslinking oligomer and quenching the polymerization with a suitable terminating group. The terminating group lacks the hydrocarbon unsaturation common to the oligomer's end cap monomers. In this way, the comparable polymer has the identical backbone to that of the crosslinkable oligomer but does not have the crosslinkable end caps. Generally the terminating group will be a simple anhydride (such as benzoic anhydride), phenol, or benzoyl acid chloride to quench the polymerization and to achieve a MW for the comparable polymer substantially equal to or initially higher than that of the crosslinkable oligomer.

We can prepare blends by combining the oligomers of the present invention with corresponding linear or multidimensional, monofunctional or difunctional oligomers of our earlier patents or our copending patent applications. We can blend three or more components. We can blend different resins (i.e., advanced composite blends corresponding to those blends described in U.S. patent application Ser. No. 07/619,677 or coreactive oligomer blends corresponding to these blends described, e.g., in U.S. Pat. No. 5,115,087 and U.S. Pat. No. 5,159,055).

Although the polymer in the blend often originally has the same length backbone (i.e., MW) as the oligomer, we can adjust the properties of the composite formed from the blend by altering the ratio of MWs for the polymer and oligomer. It is probably nonessential that the oligomer and polymer have identical repeating units, but that the oligomer and polymer merely be compatible in the mixed solution or lacquer prior to sweeping out the blend as a prepreg. Of course, if the polymer and oligomer have identical backbones, compatibility in the blend is more likely to occur.

The blends might be semi-interpenetrating networks (i.e., IPNs) of the general type described by Egli et al. "*Semi-Interpenetrating Networks of LARC-TPI*" available from NASA-Langley Research Center or in U.S. Pat. No. 4,695,610.

While woven fabrics are the typical reinforcement, the fibers can be continuous or discontinuous (in chopped or whisker form) and may be ceramic, organic, carbon (graphite), or glass, as suited for the desired application.

As shorthand, we may use the term "multifunctional" to describe oligomers having four chemically functional groups in each end cap.

Although para isomers are shown for the reactants and the oligomers (and para isomers are preferred), other isomers of the monomer reactants are possible. Meta-isomers may be used to enhance solubility and to achieve melt-flow at lower temperatures, thereby yielding more soluble oligomers with enhanced processing characteristics. The isomers (para- and meta-) may be mixed. Substituents may create steric hindrance problems in synthesizing the oligomers or in crosslinking the oligomers into the final composites, but substituents can be used if these problems can be avoided.

Therefore, each aryl group for the monomer reactants may include substituents for the replaceable hydrogens, the substituents being selected from the group consisting of halogen, alkyl groups having 1-4 carbon atoms, and alkoxy groups having 1-4 carbon atoms. We prefer having no substituents.

2. The Multiple Chemically Functional End Cap Monomers

End cap monomers of the present invention include organic compounds of the formula:

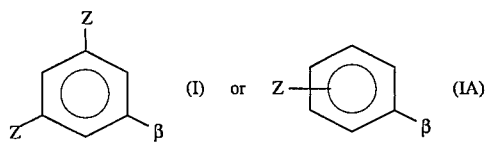

wherein

Ø=phenylene;

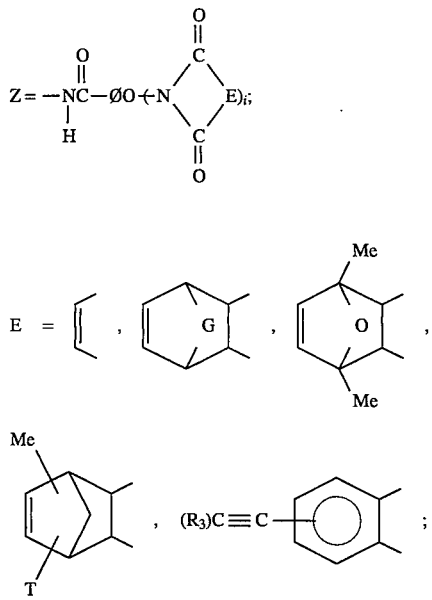

$R_3$=independently, any of lower alkyl, lower alkoxy, aryl, aryloxy, or hydrogen;

G=—CH$_2$—, —S—, —O—, or —(Me)$_2$C—;

T=allyl or methallyl;

Me=methyl;

β=—COX, —COOH, —O—Ø—COOH, —O—Ø—COX,

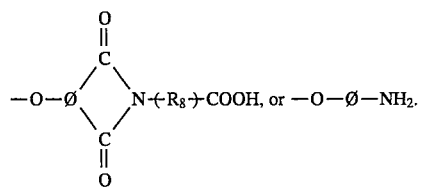

X=halogeno, and preferably chlorine;

R=a divalent residue of a diol or nitrophenol; and $R_8$=the residue of an amino/acid (preferably, phenylene). Preferably, i=2 so that the monomers have four crosslinking functionalities (i.e., the hydrocarbon unsaturation at the chain end). Other organic unsaturation, however, also can be used. The end capping functionality (E) can also be a cyanate or vinyl selected from:

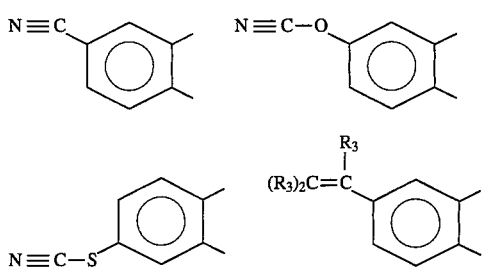

wherein $R_3$=hydrogen, lower alkyl, lower aryl, lower alkoxy, or lower aryloxy.

Ethynyl, trimethylsilylethynyl, phenylethynyl, or benzylcyclobutane end caps may also be used, if desired. These end caps will probably allow curing at lower temperatures, and will probably produced composites of lower thermal stability.

Preferred end cap monomers for forming oligomers with multiple chemically functional oligomers are the acid halides having the formula:

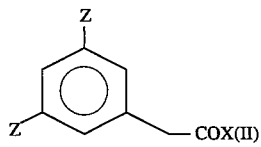

wherein

Z=

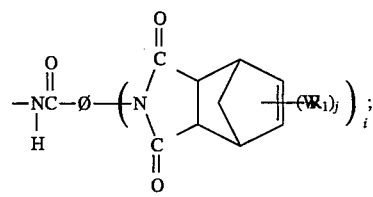

—Ø—=phenylene;

$R_1$=any of lower alkyl, lower alkoxy, aryl, substituted alkyl, substituted aryl (including in either case hydroxyl or halo-substituents on replaceable hydrogens), aryloxy, or halogen;

i=1 or 2;

j=0,1, or 2;

G=—CH$_2$—, —S—, —O—, —SO$_2$—, —(Me)CH—, or —(Me)$_2$C—; and

Me=methyl (i.e., —CH₃).

Preferably, j=0, so there are no $R_1$ substituents. Also, preferably, i=2, so each monomer has four nadic functionalities. The nadic caps are illustrative of the capping moieties as those skilled in the art will recognize based on our issued patents, copending applications, and the remainder of this specification.

The halide end cap is formed by condensing:

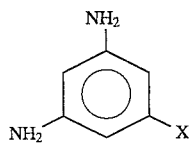

with:

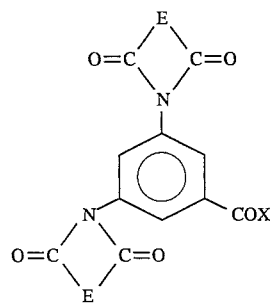

(III)

While a 1,3,5-halodiaminobenzene is shown, and this isomer is preferred, the 1,2,4-halodiaminobenzene isomer might also be used.

The acid or acid halide end cap monomer can be made in a similar way substituting, however, a diaminobenzoic acid for the halodiaminobenzene. Again, we prefer the 1,3,5-isomer, but note that the 2,3—, 2,4—, 2,5—, 3,4—, and 3,5-diaminobenzoic acid isomers are known. The 1,3,5-isomer provides maximum spacing between groups, which likely is important. An extended acid halide monomer can be made by reacting:

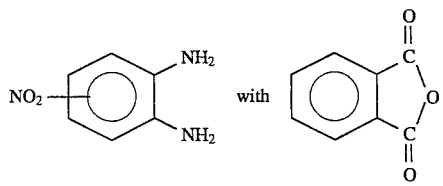

to protect the amines (probably using the 2,4-diaminonitrobenzene isomer), extracting the nitro functionality with HO—Ø—COOH to yield:

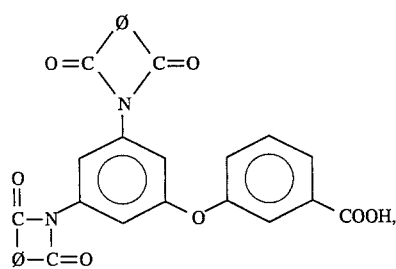

saponifying the imides to recover the amines, recondensing the amines with the acid halide described above, and, finally, converting the carboxylic acid to the acid halide, yielding:

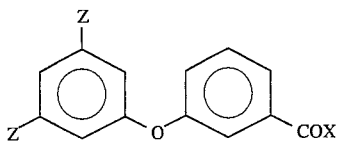

Alternatively, an acid halide end cap monomer of the formula:

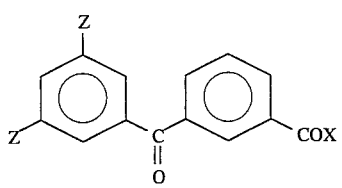

is made by condensing $(Z)_2$—Ø with a dibasic aromatic carboxylic acid in the Friedel-Crafts reaction.

It may also be possible to make an acid halide end cap of the formula:

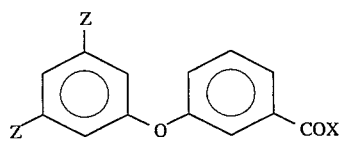

or a corresponding phenol by condensing the halide monomer with HO—Ø—COX in the Ullmann ether synthesis over a Cu catalyst. Here, the halide monomer should be dripped into the diol, if making the extended phenol.

For the preparation of imides where an anhydride is an important functionality for the end cap monomer, we extend the four functional phenol monomer of formula (II) either with nitrophthalic anhydride

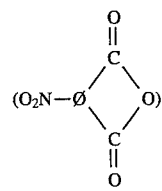

or phthalic anhydride acid chloride (i.e., trimellitic acid halide anhydride) to form an ether or ester analog having an active anhydride. The analog, then, has the formula:

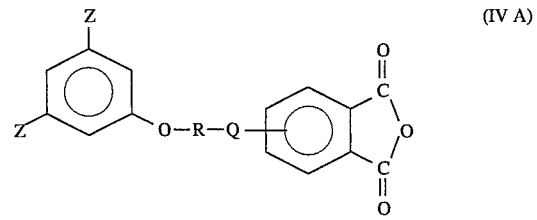

(IV A)

wherein Q=ether or ester. Another extended anhydride can be made by condensing:

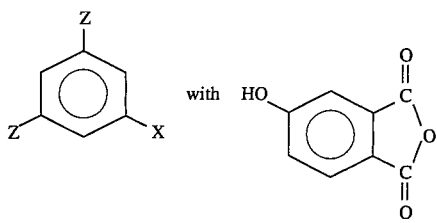

to yield:

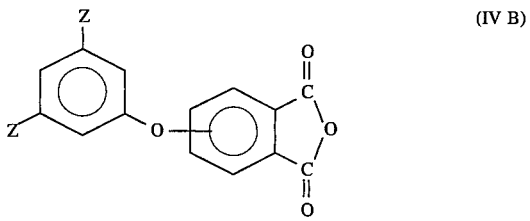

Extended anhydrides link to the backbone with an imide linkage.

We can prepare another extended acid monomer by condensing nitrobenzoic acid (or the acid halide) with the extend phenol monomer of formula (II) to yield:

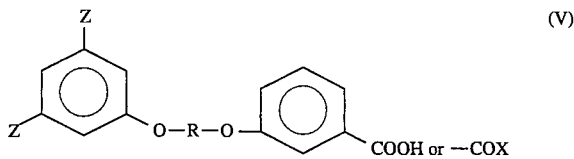

Alternatively, the anhydride of formula (IV A) or (IV B) can be condensed with an amino/acid, like aminobenzoic acid, to yield:

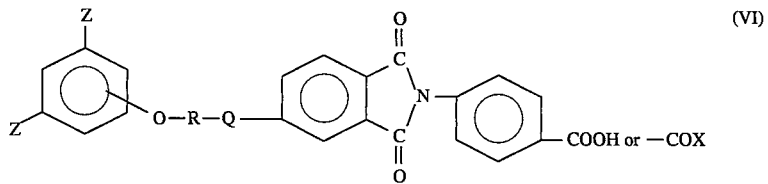

or

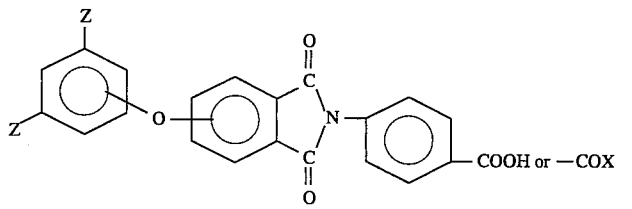

self-condensation of the amino/acid needs to be avoided, so it should be added dropwise to the anhydride. The acids can be readily converted with $SOCl_2$ to their acid halide (—COX) analog. The acid or acid halide end cap monomers link to the backbone with ester, oxazole, or imidazole linkages, for example.

Amine extended caps can be prepared by reacting the halide monomer with aminophenol to yield:

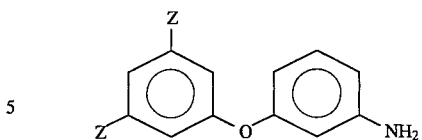

or with aminobenzoic acid can be condensed with the extended phenol monomer (taking care to avoid self-condensation of the amino/acid) to yield:

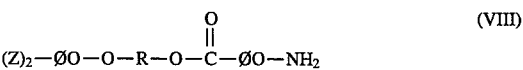

We can prepare the amine end cap monomer by converting a —COX functionality to an amine through the acid amide in the presence of ammonia, as described in U.S. Pat. No. 4,935,523.

The remainder of this specification will usually illustrate only the nadic end cap monomers, but those skilled in the art will understand that any of these other end caps could be substituted.

A pyrimidine ring can be substituted for the phenylene ring in formula (I) to form end cap monomers analogous to those described in our U.S. Pat. Nos. 4,980,481 and 5,227,461. The aromatic character of the pyrimidine ring should provide substantially the same benefits as the phenylene ring. The thermo-oxidative stability of the resulting composites, however, might be somewhat less than that achieved for the phenyl end cap monomers. The pyrimidine precursors are described in U.S. Pat. Nos. 3,461,461 and 5,227,461. The compound:

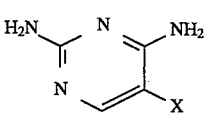

permits halo-pyrimidine end cap monomers for use in ether syntheses. These halo-pyrimidine caps have the formula:

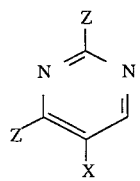 (X)

From these examples of extended monomers, those skilled in the art will recognize the wide range of monomers that might be used to introduce multifunctional capping. Furthermore, if stepwise synthetic pathways are used, the extended caps do not necessarily need to be separately synthesized and recovered (see, e.g., the ether and ester syntheses which follow).

c. Post-curing

In another aspect of the invention, we can improve the thermal stability of the composites by post-curing the composites at temperatures of up to approximately 625°–650° F. (315°–330° C.). Post-curing is desirable for all resin types. It promotes complete linking. Such post-curing treatment advantageously raises the dynamic mechanical analysis peak (and β-transition) of the treated composites, presumably by causing full crosslinking of the end cap functionalities. Preferably, we carry out the post-curing treatment of the composites at a temperature of about 625°–650° F. (315°– 330° C.) for a period of approximately 2–4 hours, but this period may vary somewhat depending upon the particular composite being treated.

The thermal stabilities achievable with such post-curing treatment are significantly higher than those generally realized without the treatment. For example, for a difunctional polyimide oligomer having a MW of about 15,000 and prepared as previously described by reacting a difunctional imidoaniline end cap, 4,4'-phenoxyphenylsulfone dianhydride, and a 50:50 molar mixture of 3,3'-phenoxyphenylsulfone diamine and 4,4'-diaminodiphenylsulfone, post-curing at a temperature of approximately 625°–650° F. (315°–330° C.) resulted in a DMA transition temperature of about 350° F. (177° C.), some 40°–50° F. (20°–25° C.) higher than without such treatment. We believe there will be a comparable benefit from post-curing four functional oligomers of the present invention.

In carrying out the post-cure treatment, a prepreg is first formed by impregnating a fabric with a polyimide oligomer. The fabric can be any of the types previously described. We heat the prepreg at an elevated temperature (e.g. 450° F. (232° C.)) and under pressure (e.g. 100 psi) for a time sufficient to cure the prepreg and form a composite. We then post-cure the resulting composite at a temperature of approximately 625°–650° F. (315°–330° C.) for a time sufficient to improve the thermal stability. During post-curing, the remaining unreacted crosslinking functionalities reorient and react to produce a nearly fully linked chain.

3. Advanced Composite Blends

Advanced composite blends comprise at least one crosslinking oligomer and at least one polymer wherein the backbones of the oligomer(s) and polymer(s) are from different chemical families. Such blends present promise for tailoring the mechanical properties of composites while retaining ease of processing. At their simplest, the composites are mixed chemical blends of a linear or multidimensional crosslinking oligomer of one chemical family, such as a heterocycle, and a linear or multidimensional polymer, unable to crosslink, from a different chemical family, such as ethersulfone. Generally the polymer has a MW that is initially higher than that of the oligomer, but the formula weight of the oligomeric portion of the blend will increase appreciably during curing through addition (i.e. homo-) polymerization between the crosslinking functionalities. The ratio of oligomer(s) to polymer(s) can be varied to achieve the desired combination of physical properties. Usually the ratio is such that the addition polymer (i.e., composite) formed during curing of the oligomer constitutes no more than about 50 mol % of the total.

While two component blends are preferred, the blends can be more complex mixtures of oligomers or polymers with or without coreactants. The blends may even include coreactive oligomers as will be explained (i.e., diamines, diols, or

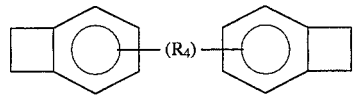

resins). We can also form blends of these multiple chemically functional oligomers with corresponding monofunctional or difunctional oligomers from our earlier patents and patent applications.

In advanced composite blends oligomers or coreactive oligomer blends are further blended with a noncrosslinking polymer having a backbone from a different chemical family. The polymer can be from any one of the families described for the oligomers, but the oligomeric and polymeric backbones must be different to form what we elect to call an advanced composite (i.e. mixed chemical) blend. The resulting blend may yield IPN or semi-IPN morphology in the consolidated resin (composite) state.

Preferably the polymer's MW initially is greater than that of the oligomer, because the MW of the oligomer in the cured composite will increase through addition polymerization. The cured composite from an advanced composite blend will have a blend of two, "long" molecules, and will not suffer from a broad distribution of MWs or a mismatch of MW that reduces the physical properties obtainable in some prior art blends, such as those Kwiatkowski suggested in U.S. Pat. No. 3,658,939.

Preferred oligomer/polymer combinations in the advanced composite blends of this invention include: amideimide/imide; amideimide/heterocycle; amideimide/heterocycle sulfone; imide/heterocycle; imide/heterocycle sulfone; imide/amide; ester/amide; ester/imide; and ester/esteramide.

Advanced composite blends allow tailoring of the properties of high performance composites. They allow averaging of the properties of resins from different families to provide composites that do not have as severe shortcomings as the pure compounds. For example, we can toughen the rigid nature of heterocycles (oxazole, thiazole, or imidazole) by an advanced composite blend comprising a heterocycle oligomer and an ethersulfone polymer. The resulting composite will have a use temperature (thermoooxidative stability) higher than pure ethersulfone and a flexibility greater than the pure heterocycle. Accordingly, the resulting composites have a blending or averaging of physical properties, which makes them candidates for particularly harsh conditions.

Although the concept of advanced composite blends is probably best suited to linear morphology, the advanced composite blends of the present invention also include multidimensional oligomers and polymers. We prefer linear morphology because the resulting composites have mixtures of polymers of relatively large and roughly equivalent MW. The individual polymers are similar in structure. We have found it difficult in many circumstances to process multidimensional oligomers that have appreciable MW, so the properties of composites made from multidimensional advanced composite blends might suffer because of diversity of MW. Furthermore, the addition polymerization reaction for multidimensional oligomers results in formation of a complex, 3-dimensional network of crosslinked oligomers that is difficult or impossible to match with the multidimensional polymers, because these polymers simply have extended chains or short chains. That is, upon curing, the multidimensional oligomers crosslink to chemically interconnect the arms or chains through the end caps, thereby forming a network of interconnected hubs with intermediate connecting chains. The connecting chains have moderate MW, although the oligomer can add appreciable MW upon curing. In contrast, the polymer (which does not crosslink) simply has a hub with arms of moderate MW. While, for linear morphology, the disadvantages of blended composites that have a wide diversity of average MW polymers as constituents can be overcome by curing relatively low MW oligomers into relatively high MW cured polymers that are roughly equivalent to the polymer constituents, the polymers in the multidimensional morphology are likely to have average MW lower than the oligomeric component. Therefore, we believe that the best results for the present invention may be achieved with systems having linear morphology where it is easier to achieve MW harmony in the composite.

Although we have yet to verify our theory experimentally, it may be possible and desirable to synthesize the polymeric component of the multidimensional advanced composite blend when curing the oligomer, and, in that way, forming relatively comparable oligomeric and polymeric networks. To achieve this effect, we would mix, for example, a multidimensional oligomer with comparable polymeric precursors, such as triamines and tricarboxylic acid halides. Upon curing, the precursors would condense to form amide linkages to form bridges between hubs in a manner comparable to the oligomeric connecting chains.

The potential problem of structural mismatch and the proposed solution for achieving comparable MW in multidimensional advanced composite blends likely also applies to coreactive oligomer blends to some degree so that homopolymerization and addition polymerization compounds remain comparable.

To overcome the problem of different MW between the oligomer and polymer in the composite, we theorize that it may be possible to prepare a blend that includes the oligomer and polymeric precursors. For example, we can mix a polyether oligomer of the general formula:

Ar—[O—Ø—O—Ø—SO₂—Ø—O—Ø—O—Ø—ξ]₃ wherein ξ is the residue of a four functional end cap monomer with polyamide polymeric precursors of the general formula:

Ar—[CONH—Ø—SO₂—Ø—O—Ø—NH₂]₃ and

Ar—[NHCO—R₄—COOH]₃ so that, upon curing, the oligomer crosslinks and the polymeric precursors condense through the amine and acid to form a polyamide polymer. This approach may be best suited for the lower curing oligomers. The product may include addition polymers and block copolymers of fire oligomer and one or both of the polymeric precursors. A Michaels addition might occur between the oligomer and amine multidimensional polymer, which would be undesirable.

The oligomers may be formed by the attachment of arms to the hub to form an extended "star" hub followed by further chain extension and chain termination. For example, phloroglucinol may be mixed with p-aminophenol and 4,4'-dibromodiphenylsulfone and reacted under an inert atmosphere at an elevated temperature to achieve an aminoterminated "star" of the general formula:

Ø—[O—Ø—SO₂—Ø—O—Ø—NH₂]₃ that can be reacted with suitable diacid halides, dianhydrides, and end caps to yield an amide, amideimide, imide, or other oligomer. By substituting 2,4-diaminophenol for aminophenol, an ethersulfone compound of the formula:

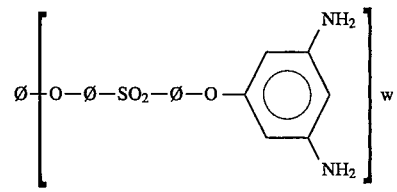

can be prepared. When reacted with an acid halide end cap monomer to produce Z end groups the product is a multiple chemically functional ether sulfone multidimensional oligomer. Extended amides, imides, etc. could also be prepared resulting in multidimensional oligomers with a high density of crosslinking functionalities.

As we have discussed, the oligomers can be synthesized in a homogeneous reaction scheme wherein all the reactants are mixed at one time, or in a stepwise reaction scheme wherein (1) the radiating chains are affixed to the hub and the product of the first reaction is subsequently reacted with the end cap groups or (2) extended end cap compounds are formed and condensed with the hub. Homogeneous reaction is preferred, resulting undoubtedly in a mixture of oligomers because of the complexity of the reactions. The products of the processes (even without distillation or isolation of individual species) are preferred oligomer mixtures which can be used without further separation to form the desired advanced composites.

We can synthesize linear or multidimensional oligomers from a mixture of four or more reactants thereby forming extended chains. Adding components to the reaction liquor, however, adds complexity to the reaction and to its control. Undesirable competitive reactions may result or complex mixtures of macromolecules having widely different properties may form, because the mixed chain extenders and chain terminators compete with one another.

In synthesizing the polymers, we use quenching compounds to regulate the polymerization (i.e., MW) of the comparable polymer, so that, especially for linear systems, the polymer has a MW initially substantially greater than the crosslinkable oligomer. For thermal stability, we prefer an aromatic quenching compound, such as aniline, phenol, or benzoic acid chloride. We generally make the noncrosslinking polymer by the same synthetic method as the oligomer with the substitution of a quenching cap for the crosslinking end cap. Of course, we may adjust the relative proportion of the reactants to maximize the MW.

While the best advanced composite blends are probably those where the individual oligomers and polymers in the blend are of modest MW and those in which the oligomer and polymer are initially in equimolar proportions, we can prepare other compositions, as will be recognized by those of ordinary skill in the art. Solvent resistance of the cured composite may decrease markedly if the polymer is provided in large excess to the oligomer in the blend.

The advanced composite blends may include multiple oligomers or multiple polymers, such as a mixture of an amideimide oligomer, an amide oligomer, and an imide polymer or a mixture of an amideimide oligomer, an amideimide polymer, and an imide polymer (i.e. blended amideimide further blended with imide). When we use polyimide oligomers, the advanced composite blend can include a coreactant, such as p-phenylenediamine, benzidine, or 4,4'-methylenedianiline. Ethersulfone oligomers can include these imide coreactants or anhydride or anhydridederivative coreactants, as described in U.S. Pat. No. 4,414,269. We can use other combinations of oligomers, polymers, and coreactants, as will be recognized by those of ordinary skill in the art.

As discussed above, the oligomeric component of the advanced composite blend may itself be a blend of the oligomer and a compatible polymer from the same chemical family, further blended with the compatible polymer from the different family. The advanced composite blends generally include only one oligomeric component unless coreactive oligomers are used.

4. Coreactive oligomer blends

Block copolymers are promising for tailoring the mechanical properties of composites while retaining ease of processing. The present invention also comprises blends of two or more coreactive oligomers analogous to those blends described in U.S. Pat. No. 5,159,055. The oligomers are terminated with mutually interreacting caps that allow formation of the block copolymer(s) upon curing. We can increase stiffness in this way in an otherwise flexible oligomer, although the four crosslinks themselves increase stiffness. For example, we can achieved stiffening for a composite made from an ethersulfone oligomer by adding a benzoxazole oligomer as a coreactant. Those skilled in the art will recognize the benefits to be gained through coreactive oligomer blends. Such blends toughen the relatively stiff and rigid heterocycle oligomers. Generally, at least one of the oligomers in the coreactive oligomer blend will include four crosslinking functionalities at each end of the backbone.

We generally prepare block copolymers formed from the coreactive oligomer blends by blending an oligomer of the general formula:

$$\xi{-}R_4{-}\xi$$

wherein $R_4$=a divalent heterocycle or heterocycle sulfone hydrocarbon radical, as we have described; and $\xi$=a four functional hydrocarbon residue of an end cap monomer used to form the oligomer with a coreactive oligomer of the general formula:

$$Z^*_k{-}B{-}Z^*_k$$

wherein k=1,2, or 4;

B=a hydrocarbon backbone that is from the same or a different chemical family as $R_4$;

$Z^*$=a hydrocarbon residue including a segment selected from the group consisting of:

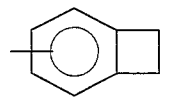

—Ø—$NH_2$, or —Ø—ρH;

ρ=—O— or —S—; and

—Ø—=is phenylene.

Generally, the hydrocarbons are entirely aromatic with phenylene radicals between the linkages that characterize the backbones. The oligomers can be linear or multidimensional in their morphology. The components of these coreactive blends should have overlapping melt and curing ranges so that the crosslinking functionalities are activated at substantially the same time, so that flow of the blend occurs simultaneously, and so that, for heterocycles, the chain-extension occurs in the melt where the products are soluble. Matching the melt and curing ranges requires a selection of the chemistries for the coreactive blend components, but achieving the match is readily within the skill of the ordinary artisan.

The coreactive oligomer blends can comprise essentially any ratio of the coreactive oligomers. Changing the ratio of ingredients, of course, changes the physical properties in the final composites. Curing the coreactive oligomers involves mutual (interlinking) polymerization and addition polymerization. Therefore, we generally use equimolar mixtures of the ingredients (i.e., the $\xi$ and $Z^*$ components) in the blends.

The individual oligomers should initially have relatively low MW (preferably no more than and, generally, around 10,000) and, accordingly, should remain relatively easy to process until the curing reaction when extended chain and block copolymers form to produce the composite. A complex mixture of at least three types of addition polymer form upon curing.

The coreactive oligomer blends can also include non-crosslinking polymers, as desired, to provide the desired properties in the composites. That is, the coreactive blend may include the two crosslinking oligomers and a non-crosslinking compatible polymer, thereby forming a blend with three or more resin components.

We can prepare oligomers of the general formula $\xi{-}R_4{-}\xi$ or $Z^*_k{-}B{-}Z^*_k$ by reacting suitable end cap monomers with the monomer reactants that are commonly used to form the desired backbones. For example, we prepare an imidesulfone by reacting a sulfone diamine with a dianhydride. We prepare ethersulfones by reacting a suitable dialcohols (i.e. diol, bisphenol, or dihydric phenol) with a dihalogen as described in U.S. Pat. No. 4,414,269. Similarly, the end cap monomers for the $Z^*_k{-}B{-}Z^*_k$ oligomers generally are selected from the group consisting of aminophenol, aminobenzoic acid halide, $H_2N{-}Ø{-}SH$, or the like. The $Z^*_k{-}B{-}Z^*_k$ oligomers include any diamines, diols, or bisulfhydryls we have previously described. In this circumstance, k=1.

Upon curing, the oligomers homopolymerize (i.e. addition polymerize) by crosslinking and form block copolymers through the Michaels addition reaction between the hydrocarbon unsaturation of one oligomer and the amine, hydroxyl, or sulfhydryl group of the other. The reaction of the hydrocarbon unsaturation of one oligomer with the

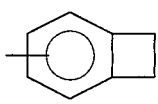

functionality of the other follows the mechanism described in U.S. Pat. No. 4,719,283 to form a cyclohexane linkage by bridging across the double bond. With the acetylene (triple) unsaturation, a cyclohexene ring results.

The Michaels addition reaction is illustrated as follows:

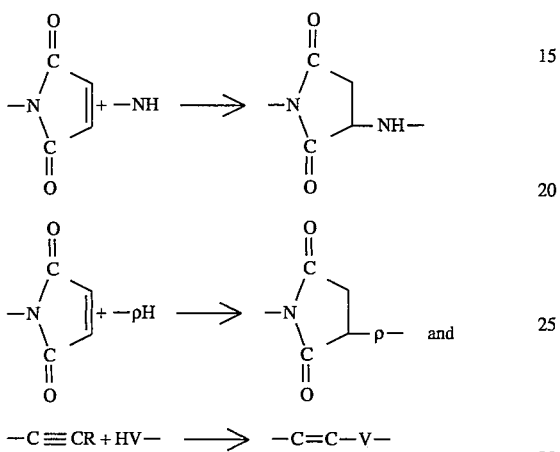

wherein V=—NH—, —O—, or —S—. For the other end caps, we believe a reverse Dieis-Alder decomposition reaction (induced by heating the oligomers) results in the formation of a reactive maleic moiety and the off-gassing of a cyclopentadiene. The methylene bridge decomposes to the maleic compound at about 625°–670° F. (330°–355° C.) while the —O— bridge decomposes at the lower temperature of about 450° F. (230° C.).

The reactive group might also be —CNO instead of the amine, but we do not recommend use of these dicyanates.

While we have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples are given to illustrate the invention and not intended to limit it. Accordingly, limit the claims only as necessary in view of the pertinent prior art.

We claim:

1. A linear or multidimensional heterocycle or heterocycle sulfone oligomer having two or four crosslinking sites at each end of its backbone, comprising:

$$(Z—)_i—\emptyset—(—R_4—)—\emptyset—(—Z)_i \text{ or}$$

$$\partial—[—(—R_4—)—\emptyset—Z_i]_w$$

wherein

Z=

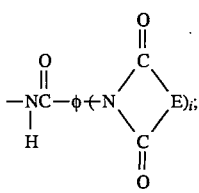

i=1 or 2;
∅=phenylene;
E=

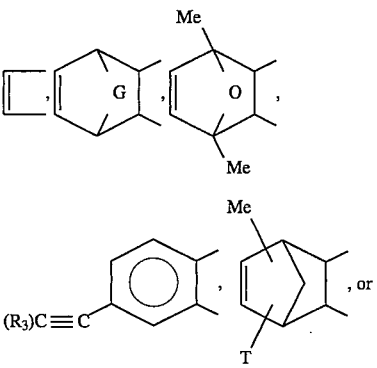

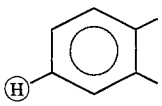

∂=an organic hub;
w=3 or 4;
Me=methyl;
G=—CH$_2$—, —S—, —SO$_2$—, —O—, or —CO—;
R$_3$=phenylene or hydrogen;
T=allyl or methallyl;
R$_4$=a divalent heterocycle or heterocycle sulfone radical; and
Θ=—C≡N, —OC≡N, —SC≡N, or —CH=CH$_2$.

2. A coreactive blend comprising the oligomer of claim 1 and a second compatible oligomer having a different capping site reactive with E.

3. A blend comprising the oligomer of claim 1 and a compatible polymer.

4. A prepreg comprising the oligomer of claim 1 and a reinforcing additive in fiber or particulate form.

5. A composite comprising the cured prepreg of claim 4.

6. The oligomer of claim 1 wherein R$_4$ is a heterocycle formed by the condensation of a diacid halide with a four functional basic compound selected from the group:

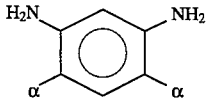

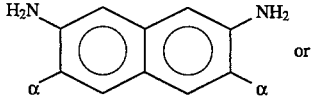

-continued

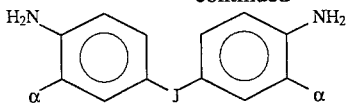

wherein
J=—CO—, —SO₂—, —(CF₃)₂C—, —S—, or —O—; and
α=—OH—, —SH—, or —NH₂.

7. An advanced composite blend comprising a mixture of at least one oligomer of claim 1 and at least one compatible polymer from a chemical family different from the oligomer.

8. The oligomer of claim 1 having linear morphology of the general formula:

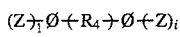

wherein R₄ is made by condensing a diacid halide with a four functional basic compound to form a heterocycle linkage, and
wherein the diacid halide is selected from the group consisting of compounds of the formula:

XOC—R₉—COX wherein
X=halogen; and
R₉ is radical selected from the group consisting of:
(a) phenylene;
(b) naphthylene;
(c) biphenylene;
(d) a polyaryl "sulfone" divalent radical of the general formula:

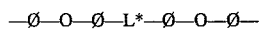

wherein L*=—S—, —O—, —CO—, —SO₂—, —(Me)₂C—, or —(CF₃)₂C—,
(e) a divalent radical having conductive linkages, illustrated by Schiff base compounds, selected from the group consisting of:

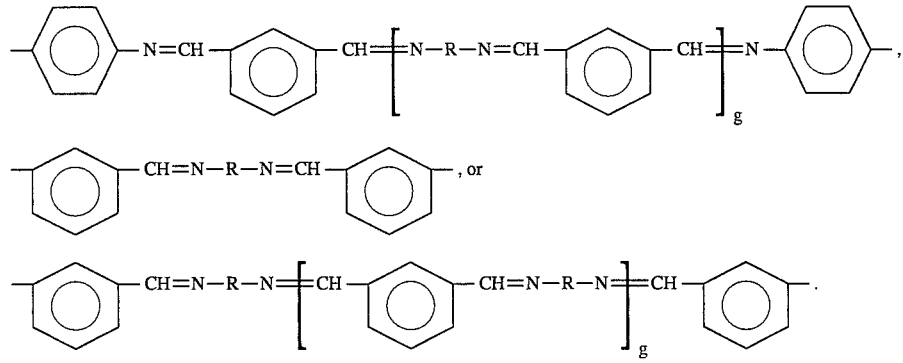

wherein R is selected from the group consisting of: phenylene; biphenylene; naphthylene; or a divalent radical of the general formula: —Ø—W—Ø— wherein W=—SO₂— or —CH₂—; and g=0–4; or (f) a divalent radical of the general formula:

—R₁₀—NHCO—Ø—CONH— wherein R₁₀=a C₂ to C₁₂ divalent aliphatic, alicyclic, or aromatic radical.

9. The oligomer of claim 8 wherein the four functional basic compound is selected from the group consisting of:

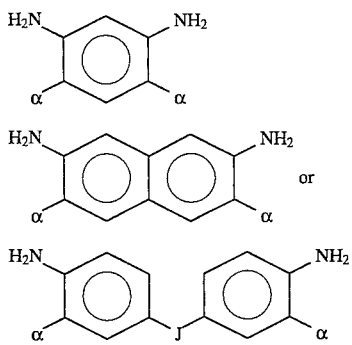

wherein
J=—CO—, —SO₂—, —(CF₃)₂C—, —S—, or —O—; and
α=—OH—, —SH—, or —NH₂.

10. The oligomer of claim 8 wherein R₉ is selected from the group consisting of:

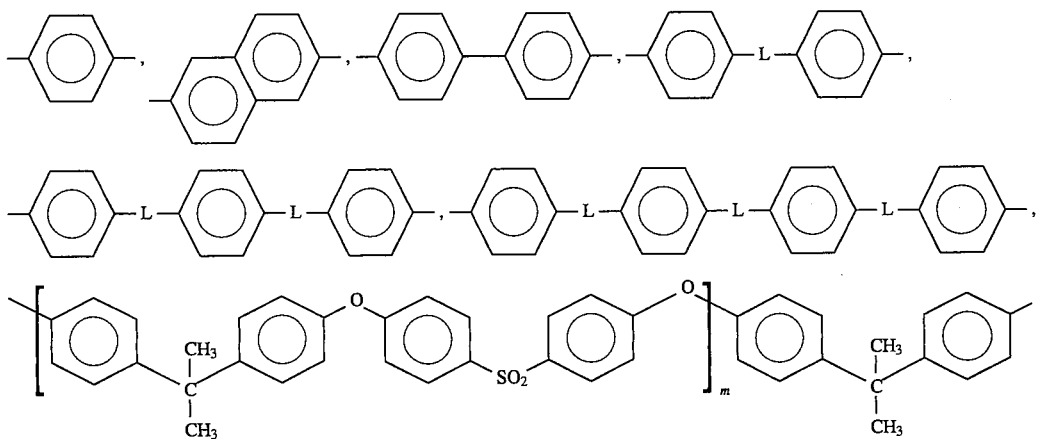

wherein m is 1–5 and L is —S—, —O—, —CO—, —(Me)$_2$C—, or —(CF$_3$)$_2$—.

11. The oligomer of claim 10 wherein the four functional basic compound is selected from the group consisting of:

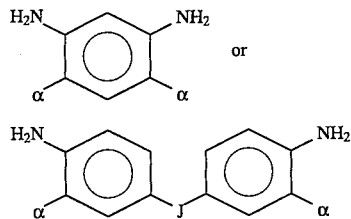

J=—CO—, —SO$_2$—, —(CF$_3$)$_2$C—, —S—, or —O—;
n=a small integer, generally less than 20; and
α is selected from the group consisting of —OH, —SH, and —NH$_2$.

12. The oligomer of claim 11 wherein R$_9$ is selected from the group consisting of:

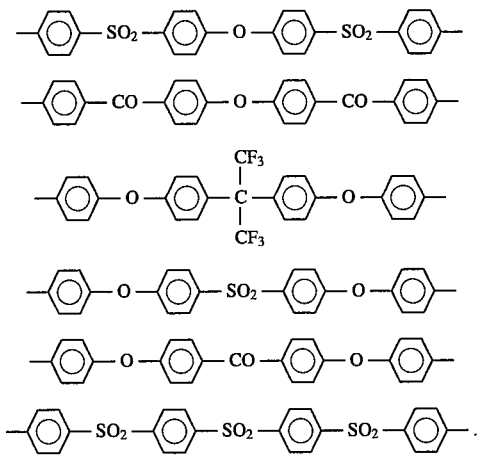

13. The oligomer of claim 11 wherein i is 2.

14. The oligomer of claim 1 having multidimensional morphology of the general formula:

$$\partial \text{—}[(R_4)\text{—}\phi\text{—}Z_i]_w$$

wherein

∂ is phenylene;

w is 3; and

R$_4$ is an alternating heterocycle made by condensing a diacid halide of the formula XOC—R$_9$—COX with a four functional basic compound, wherein the four functional basic compound is selected from the group consisting of:

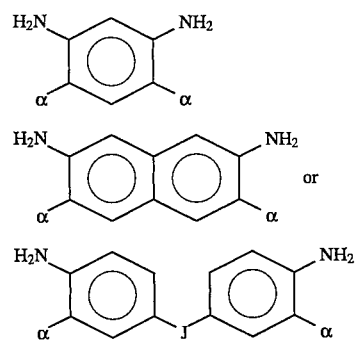

wherein

J=—CO—, —SO$_2$—, —(CF$_3$)$_2$C—, —S—, or —O—; and

α=—OH—, —SH—, or —NH$_2$ and wherein R$_9$ is selected from the group consisting of:

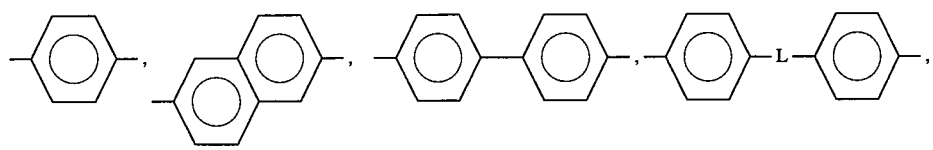

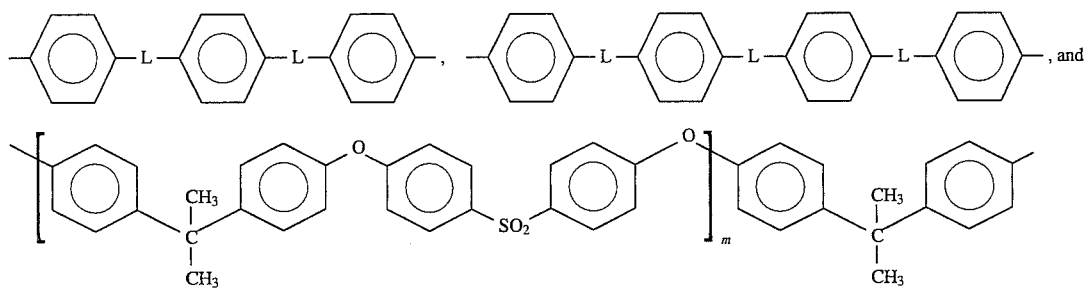

where m=1–5; and

L=—S—, —O—, —CO—, —SO$_2$—, —(Me)$_2$C—, or —(CF$_3$)$_2$C—.

15. The oligomer of claim 14 wherein i is 2.

16. A multifunctional heterocycle or heterocycle sulfone oligomer formed by reacting:
 (a) 2 moles of an extended acid halide end cap monomer;
 (b) n moles of a diacid halide; and
 (c) n+1 moles of at least one four functional basic compound of the general formula:

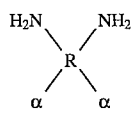

wherein

R is selected from the group consisting of compounds of the general formula:

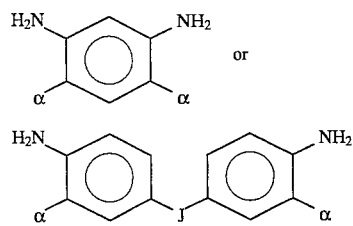

J=—CO—, —SO$_2$—, —(CF$_3$)$_2$C—, —S—, or —O—;
n=a small integer, generally less than 20; and
α is selected from the group consisting of —OH, —SH, and —NH$_2$.

17. A multiple chemically functional multidimensional heterocycle or heterocycle sulfone oligomer comprising a compound of the general formula:

∂—(Q)$_w$ wherein

∂=an aromatic hydrocarbon residue of valency w;
w=an integer greater than or equal to 3;
Q=a hydrocarbon radical that includes (i) at least two heterocycle linkages selected from the group consisting of oxazole, thiazole, or imidazole linkages, the heterocycle linkages being attached to a radical of the general formula:

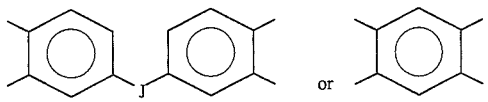

wherein

J=—CO—, —S—, —O—, —SO$_2$—, or —(CF$_3$)$_2$C—, and (ii) a terminal residue of an extended acid halide end cap monomer.

18. The oligomer of claim 17 wherein ∂ is phenylene and the monomer has the general formula:

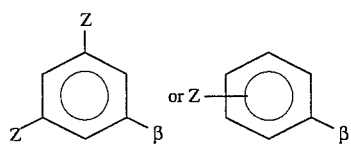

wherein

β is a radical having an active —COX functionality;
X is halogen;

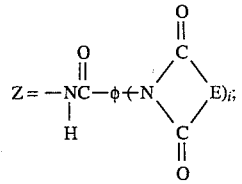

i=1 or 2;
Ø=phenylene;
E=

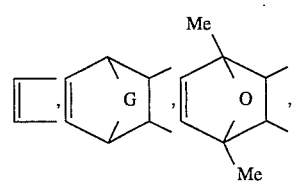

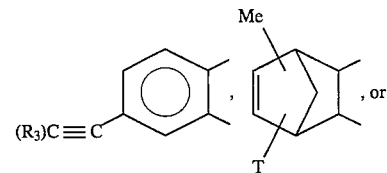

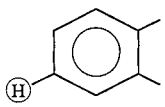

19. A coreactive oligomer blend comprising a mixture of a first oligomer of the general formula:

wherein

A=a divalent heterocycle or heterocycle sulfone backbone; and

ξ=an unsaturated hydrocarbon residue of an end cap monomer of the formula:

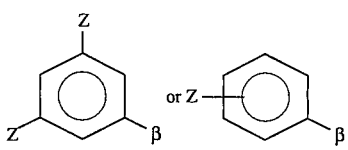

wherein

Z is defined in claim 12; and β is a functionality allowing ε to bond with A; and a second oligomer of the general formula:

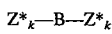

wherein k=1, 2, or 4;

B=a hydrocarbon backbone;

Z*=a hydrocarbon residue including a segment selected from the group consisting of:

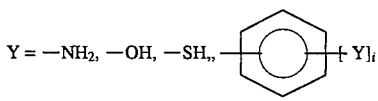

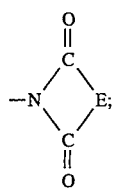

i=1 or 2;

E=an unsaturated organic radical selected from the group consisting of:

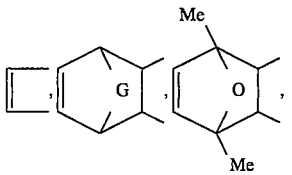

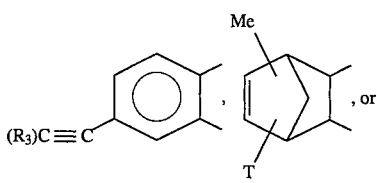

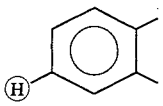

$R_3$=phenylene or hydrogen;

G=—$CH_2$—, —S—, —O—, —(Me)CH—, or —(Me)$_2$C—

Me=methyl;

T=methallyl or allyl; and

Θ=—C≡N, —O—C≡N, —S—C≡N, or —CH=$CH_2$.

20. The blend of claim 19 wherein A has a backbone that is from a different chemical family from B to form a coreactive advanced composite blend.

* * * * *